INVENTOR.
GLENN DAVIDSON
BY
Oberlin & Limbach
ATTORNEYS.

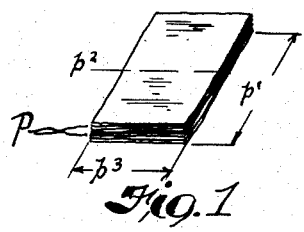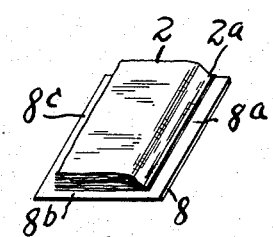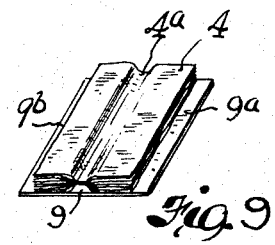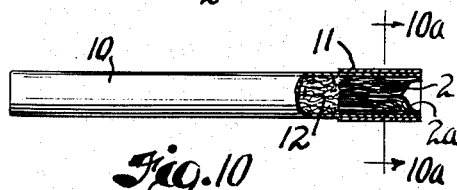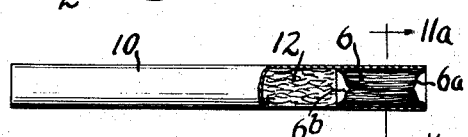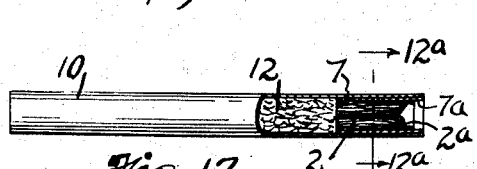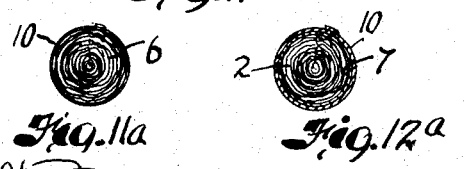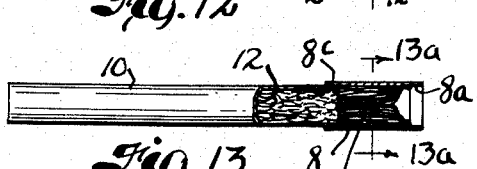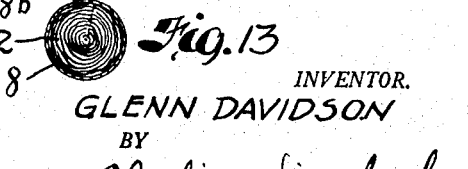

Aug. 25, 1959     G. DAVIDSON     2,900,989
CIGARETTE FILTER TIP

Filed Jan. 26, 1955     3 Sheets-Sheet 3

INVENTOR.
GLENN DAVIDSON
BY
Oberlin Limbach
ATTORNEYS.

United States Patent Office

2,900,989
Patented Aug. 25, 1959

2,900,989

CIGARETTE FILTER TIP

Glenn Davidson, Aurora, Ill.

Application January 26, 1955, Serial No. 484,128

10 Claims. (Cl. 131—208)

The present invention, relating as indicated to filter tips for cigarettes, has more particular regard to the provision of an improved filter element adapted for the indicated use. While the provision of cigarettes with filter tips or mouth-pieces has greatly increased within recent years, there has been comparatively little improvement made in the construction thereof, either from the standpoint of effective filtering action, simplicity and ease of manufacture, or the comfort of the smoker. Thus one form of filter tip in current use consists simply of a wad of cotton enclosed within a cylindrical paper wrapper which is in turn fitted into or upon one end of the cigarette. Another, perhaps more widely used, form is made by drawing strands of cord or crepe paper into a tubular cylinder-former, thereby providing when cut into suitable lengths a cylindrical element capable of being incorporated in or attached to a cigarette in the same manner as such first described filter tip.

Both forms of filter element have the disadvantage from the smoker's standpoint of leaving loose ends of stranded material, whether of such cotton wad or strands or strips of paper, where they come in contact with the tongue or lips; as a result they readily absorb moisture, e.g. saliva, with decrease of filtering efficiency. Furthermore, it is difficult to make either such type of element so as to provide uniform filtering action. A slight difference in density of the material in the case of a cotton wad may constitute of the latter an undesirable obstruction or render it useless for the intended purpose. In addition to these defects the other type is characterized by longitudinal channels of varying cross-section, with the result that most of the smoke will be drawn through those having the larger area.

One principal object of the present invention is to provide a filter element for use in a cigarette tip or the like which will have a much higher filtering coefficient than filter tips heretofore used. At the same time the element is constructed so as to eliminate loose or projecting strands or the like which may contact the lips or tongue of the smoker, as well as to permit the incorporation of a granular material as a so-called filter aid without similar objectional contact. A further object is to provide such an element which can be readily and inexpensively fabricated from available materials, specifically, as a desirable material, from crepe or tissue paper, or from creped cellulose or cotton wadding in sheet form. Still another object is to provide such elements in a form readily adapted for use in connection with conventional types of machines used in cigarette manufacture.

To the accomplishment of the foregoing and related ends, said invention, then, consists of the means hereinafter fully described and particularly pointed out in the claims.

The annexed drawings and the following description set forth in detail certain means embodying the invention, such disclosed means constituting, however, but several of the various forms in which the principle of the invention may be used.

In said annexed drawings:

Fig. 1 is a perspective view, more or less diagrammatic in character, of a pad of fibrous material such as may be employed in the fabrication of my improved filter element;

Fig. 2 is a similar view of one form of such element in an intermediate stage of its fabrication;

Figs. 3, 4, 5 and 6 are views similar to that of Fig. 2 but showing modifications in the form of the element in the same stage of its manufacture;

Fig. 7 is a perspective view of the element as illustrated in Fig. 2 combined with an additional component;

Fig. 8 is a view similar to Fig. 7 but incorporating a modified form of such component;

Fig. 9 is likewise a perspective view similar to that of Fig. 7 but showing the element as illustrated in Fig. 6 combined with an additional component similar to that shown in Fig. 7;

Fig. 10 is a central longitudinal section of a completed cigarette having incorporated therewith a filter element comprising a pad of fibrous material as illustrated in Fig. 2;

Figs. 11, 12 and 13 are similar sectional views of cigarettes in which have been incorporated elements of the form shown in Figs. 6, 7 and 8, respectively;

Figs. 10a, 10b, 11a, 12a and 13a are respectively cross-sections through the cigarettes illustrated in Figs. 10 to 13 inclusive, as indicated by the section lines a—a thereon;

Figure 14:
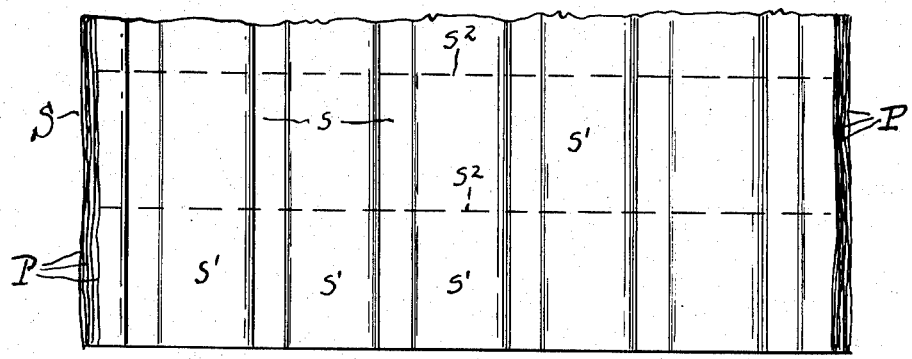
Fig. 14 is a plan view of a sheet of wadding or like filter material showing a preliminary step in the making of my improved filter element therefrom.

While, as will be later set forth, other kinds of fibrous material may be employed, in the several forms of my improved filter element illustrated in an intermediate stage of fabrication in Figs. 1 to 9 inclusive, as well as in such element shown as incorporated in a finished cigarette in Figs. 10 and 11 respectively, the fibrous material, whereof the pad is in each such illustrated case composed, is made up of superimposed layers P of air-permeable paper. Thus such layers may consist of sheets of thin tissue paper, or crepe paper, or the assembly may consist of so-called creped or cellulose wadding, which is conveniently available in sheet or blanket form. As need not be explained in detail, this type of wadding comes from the mill in the form of a number of superposed loosely assembled, highly porous layers of a cellulosic product; and it may be had as a sheet of the width of the Fourdrinier machine on which it is made, and of indefinite length, rolled up in the same manner in which ordinary paper is rolled.

Although, as will be presently explained, my improved filter element may, for the purpose of quantity production, be made from a sheet of fibrous material such as the one just described by a continuous or multiple operation, for the purpose in hand it will be assumed that the fabrication of the element is begun with a pad of such fibrous material cut to general rectangular form, as illustrated in Fig. 1, all four edges of such pad being preferably at right angles to the opposite flat surfaces thereof. The transverse dimension $p'$ of such pad may desirably equal, or closely approximate, the circumference of the completed filter element formed by rolling such pad into approximately cylindrical shape about a longitudinal median line $p^2$. On the other hand, the length $p^3$ of the pad, and consequently the length of the cylindrical shape made therefrom, may vary depending upon the degree of filtering action it is desired to obtain. Also another factor in determining the length will be of course the character of the fibrous material.

The first step in the fabrication of the filter element from the pad just described is to closely compact the component material, specifically the layers P of porous cellulose sheets, along a line, or relatively narrow area, disposed transversely of the median line $p^2$ of the pad, i.e. of the axis of the cylindrical shape into which it is to be next formed. Where dealing with the material described above, such compacting if under sufficient pressure will in effect seal the plies along such line, although if desired, an adhesive in a limited amount may be introduced between the plies along such line.

Figs. 2 and 6, inclusive, respectively illustrate various permissible locations as well as widths of such sealing line or area. Thus, in the case of the element 2 illustrated in Fig. 2, the line 2a of compression or sealing is narrow, is applied to the sheets P at one end of the pad of Fig. 1, and is furthermore located in the plane of one of the flat faces of the pad. In the case of the element 3, illustrated in Fig. 3, the line of compression 3a, otherwise similar to line 2a, is located in a plane intermediate of the two flat faces of the pad. While in the form of element illustrated in Fig. 4, the line 4a of compression or sealing may not only be located intermediately between the flat faces of the pad but also intermediately of the ends thereof.

The element 5, illustrated in Fig. 5, is substantially identical with that illustrated in Fig. 2, in that the compressed or compacted area 5a is located at one end of the pad P of Fig. 1 and lies in the plane of one of the flat faces of the pad. However, instead of being relatively narrow, such area is made wider so as to extend in the form of a lip of compacted material lying in such plane. The further modification in the case of the element 6 illustrated in Fig. 6 consists in the provision of two such lips 6a, 6b, similarly located in the plane of one of the flat faces and extending in opposite directions from the respective ends of the pad.

Instead of forming the element with a lip by thus compacting or compressing a relatively wide area across the pad, there may be attached to the lower face of pad 2, such as is illustrated in Fig. 2, a separate sheet 7 of paper, or like materials, of such extent as substantially to cover such face and extend in the form of a lip 7a beyond the line 2a of compression or sealing. In some cases it may be found desirable to extend such sheet, as illustrated by sheet 8 in Fig. 8, so as to provide a laterally projecting lip 8b, in addition to lip 8a, the latter otherwise corresponding with lip 7a in the form of element illustrated in Fig. 7. In Fig. 8, the sheet in question is likewise shown as extending in the form of a lip 8c in a direction opposite to lip 8a. For that matter, a separate sheet 9 may be attached in a similar manner to one face of the element 4 illustrated in Figs. 4, 5 and 6. By way of example, in Fig. 9 there is shown such element 4 thus attached to a sheet 9, the latter being of such extent as to project beyond each end of the element to provide oppositely extending lips 9a and 9b.

As will presently appear, where a sheet, such as any of those last described, is employed as a component of the filter element, it will be desirably attached to the latter as by suitable adhesive applied either over the entire contacting areas of sheet and pad, or if desired, only along a transverse line, preferably along a line adjacent one end of the element, which will be sufficient to retain the two component parts in proper relation when the element is rolled into cylindrical form to provide the completed filter. The sheet thus employed should be relatively more impervious than the component plies of the pad from which the element is made, and sufficiently stiff so that when the latter is thus rolled in cylindrical form it will assist in preserving such form. It will then in effect constitute a tubular shell within which the filter element proper is retained.

However, when the wrapper of the cigarette in which the filter element is to be incorporated is sufficiently strong, or is reinforced by applying thereto a cork or similar covering to the tip end, so as to retain such completed filter element in its final cylindrical form without the assistance of such an enclosing tubular component in the filter element, the sheet just described may be omitted. Not only may this be desirable where the cigarette wrapper carries a reinforcing mouth-piece either of cork, paper, or other material, but also where it is intended to be used with an independent mouth-piece.

As just indicated, my improved filter element may be incorporated in a cigarette in a variety of ways, that is structurally and without regard to the manner in which the cigarette itself is manufactured, i.e. by what particular type of cigarette making machine. For example, as illustrated in Figs. 10 and 10a, a filter element 2 such as illustrated in Fig. 2, when rolled into cylindrical form may be directly inserted in one end of a cigarette, the wrapper 10 of which has been reinforced by a shell 11 of suitable material, e.g. cork, designed to form a mouth-piece. In such case the element will be located so that its other sealed end 2a will desirably, although not necessarily, lie a short distance within the end of the shell 11, and the latter will correspondingly project therebeyond. In assembling the filter element, its opposite end will of course lie in close contact with the tobacco filler that forms the body of the cigarette.

The form of filter element 5 shown in Fig. 5 may be incorporated in a cigarette in the same manner as just described for element 2. Furthermore, the employment of an additional shell 11 is optional in either case. Indeed, where the lip 5a of element 5 is of sufficient width, it may, by itself, stiffen the mouth end of the cigarette sufficiently to render any further reinforcement unnecessary.

It should be explained that while, as illustrated in transverse sectional view of Fig. 10a, the filter element, e.g. elements 2 and 5, may be rolled into cylindrical form by bringing their uncompressed lateral edges into abutting relation, the same general form may be given the element by folding it in the manner illustrated in Fig. 10b. As there shown the element has been refolded upon itself about longitudinal line $p^2$ of Fig. 1, with the result that the element will fit snugly within the end of a cigarette.

Accordingly, in referring to an element of cylindrical form, it will be understood that no limitation is implied to the particular manner in which the original pad is folded to give it such form.

Figs. 11 and 11a illustrate, similarly to that just given for filter element 2, the manner in which the filter element of the form shown in Fig. 6 may be incorporated in a finished cigarette. Such element 6, being provided with oppositely directed lips 6a and 6b may sufficiently stiffen the end of the cigarette so as to make unnecessary the use of a supplemental reinforcement such as the shell 11' in Fig. 10.

In Figs. 12 and 12a there is illustrated one way in which a filter element of the form shown in Fig. 7 may similarly be incorporated in a cigarette. As previously described, this form of my improved filter element comprises the simple element 2 shown in Fig. 2, as attached to a sheet 7 of paper or like material, which when the element is rolled in cylindrical form provides a stiffening shell within which the filter element, proper, is enclosed. Accordingly this type of element, when enclosed in the cigarette wrapper 10 at one end of the tobacco filler 12, will impart sufficient stiffness to constitute in itself a satisfactory mouth-piece for the cigarette.

Figs. 13 and 13a illustrate a completed filter element of the form shown in Fig. 8, wherein, as previously described, the simple element 2 of Fig. 2 is attached to a sheet 8 which projects not only from the opposite ends thereof, but also laterally in the form of lips 8a, 8b and 8c. When this type of element is rolled up into cylindrical form, the laterally extending lip 8b will overlie the opposite edge of the sheet and will be desirably adhered thereto so that, without more, the element will retain its cylindrical form. The filter material will then in effect be contained within a tube with the lips 8a and 8c projecting beyond the respective ends thereof, and in this form such filter element may be attached directly to the end of the cigarette, either incidentally to rolling up the element in the fashion just described or after the filter tip has thus been separately made, viz. by inserting one end of the cigarette into the recess formed by lip 8c. In the latter case this form of element may be used as an independent filter tip for cigarettes; in other words, it may be attached by the user to any standard kind of cigarette which is of the proper diameter thus to fit within the recess in question.

Each of the several forms of my improved filter element it will be noted is characterized by having the filter material, whereof it is composed, compressed along a line transverse of the axis of said element when rolled in cylindrical form for incorporation with a cigarette. As a result, the component fibers of such material, whatever their nature, will be secured against displacement, and their uniform cross-sectional distribution in the body of the filter maintained. Furthermore, where the line of compression or sealing, as is preferable, is located at that end of the element which will be inserted in the smoker's mouth, the tendency of the fibers to come loose, with consequent annoyance to the smoker, it minimized. At the same time, where a proper filter material is selected, such as the previously mentioned porous cellulose sheets, such compression or sealing of the element does not substantially reduce the draft, or drawing of air, through the element. Indeed, I have ascertained by numerous stain tests that the draft, in contradistinction to present commercial types of cigarette filters, is strikingly uniform throughout the entire cross-section, or for that matter throughout the entire body of my improved type of filter element.

The foregoing, highly advantageous, results will be obtained to a consequential degree even where the porous material, wherefrom the filter elements are formed, does not consist of superposed layers but of a single layer of corresponding thickness made up of filamentous material, such for example as continuous filament synthetic fiber tows. By sealing, transversely of the direction in which the fibers are disposed, a pad cut from such a layer or sheet a strikingly superior filtering action is obtained over an element consisting simply of such fibers bundled together.

In résumé, by utilizing filter elements of the character hereinbefore described, I am able to provide a substantially cylindrical mouth-piece filter tip for cigarettes and the like, that comprises a body of air-permeable fibrous material wherein a recess or cavity is formed by compacting a limited section of such material to relatively non-air-permeable condition.

Not only does my improved filter element present per se the foregoing advantages when incorporated in a cigarette, but, as previously stated, such element lends itself to inexpensive, high rate production. This of course is a very important factor in the utilization of filter elements in cigarettes, which as is well known, are made by highly perfected methods and mechanism having an exceedingly high output rate. Furthermore, such improved element is adapted, in an intermediate form of its manufacture, to be assembled for use in several such modern types of cigarette making machines, without diminishing the high rate of production of which they are capable. The importance of this will be apparent when it is recalled that such machines are set to produce cigarettes at the rate of well over one thousand per minute.

Without limitation as to the particular filter material that may be utilized in the fabrication of my filter elements, and by way of illustration only, I will now describe a preferred method for manufacturing the same where such material consists of the previously described superposed multiple layers of porous cellulose sheets P. As ordinarily made, the cellulosic particles or fibers which compose such sheets or plies are quite loosely assembled with numerous interstices therebetween. Indeed the individual sheet or ply may be so tenuous as to be barely capable of being drawn off from the Fourdrinier screen. It may then be folded back and forth upon itself to form a composite sheet wherein the individual plies to the number of ten or more are loosely superimposed to form a sheet S of the character illustrated at the left in Figs. 14 and 15; or a corresponding number of such sheets, as they come from the machine, may be separately reeled and subsequently assembled to form such a multi-ply wadding sheet S.

Figure 15:
Fig. 15 is a side elevation of, of equally a longitudinal section through, such a sheet.

A preliminary step in the fabrication from such a sheet S of the previously described filter elements consists in pressing the component layers or plies together along transverse lines $s$ which later will be seen to constitute the lines or areas 2a, 3a, etc. of compression or sealing referred to in the description given above of the several forms the individual filter element may take. These lines $s$, as illustrated in Figs. 14 and 15, are of substantial width, specifically they are approximately twice the width of the lip 5a in the case of the element illustrated in Fig. 5, this being the specific element which, for the purpose of the present description, it is assumed is to be made from the sheet S.

Such lines or areas may be produced by any suitable method; one convenient way will be to pass the sheet, after its formation, between rolls, at least one of which is formed with encircling ribs of a width corresponding with that of the areas in question. Immediately following the step just described, or coincidentally therewith, the sheet is severed along dotted lines $s^2$ into strips or ribbons having a width corresponding to the transverse dimension of the desired filter pad, i.e. the width p' as indicated in Fig. 1. The resulting strip or ribbon S', as shown in perspective in Fig. 16, will accordingly comprise a succession of pads s' of the width just stated and of a longitudinal extent equal to two of the filter pads 5, as illustrated in Fig. 5, disposed with their prospective square cut ends in opposition to each other. Furthermore such paired pads are separated by compressed areas $s$ which, as noted above, should be approximately equal to twice the width of lip 5a, Fig. 5.

Figure 16:
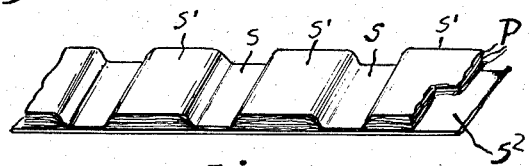
Fig. 16 is a perspective view showing a series of such elements as made from a strip of the material prefabricated as illustrated in Figs. 14 and 15.

In Fig. 16 the preformed strip or ribbon S' just described is shown associated with a strip S² of paper or like material such as has been previously described as a component of the filter element illustrated in Figs. 7, 8 and 9, respectively.

The strip consisting of the pads s' (i.e. paired filter elements) with intervening transverse compressed areas s will next be attached to such sheet S², for example by adhesive applied to the opposed flat faces of the strip and sheet, either over the entire area of such faces or along the portions thereof adjacent the compressed areas between the elements. The strip with its series of paired elements may of course be of indefinite length, depending upon the length of the sheet S of wadding from which made, and the attached sheet or strip S² of paper will of course be of corresponding length. The width of the latter will, as shown in Fig. 16, be the same as that of such series of paired filter elements where the individual element is of the form illustrated in Fig. 5. However, as will be readily apparent, if desired to make an element with a lateral lip 8b, as illustrated in Fig. 8, the sheet of paper will be correspondingly wider so as to extend beyond the lateral edges of the series of paired elements.

Figure 17:
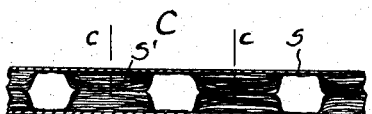
Fig. 17 is a central longitudinal section through the strip of material shown in Fig. 16 after it has been rolled up into cylindrical form.

As in the fabrication, previously described, of an individual filter element, so in the case of the foregoing series of such elements, whether or not attached to a backing sheet, in the form of a ribbon of indefinite length, the next step is to roll such ribbon into the form of a cylinder with the resulting production of a cylindrical rod C, shown in axial section in Fig. 17, likewise of indefinite length. Where the backing sheet is of such width as to provide a laterally extending lip, it may be utilized, as previously described, to form a sealed shell around the filter element proper by bringing such lip in overlying relation to the opposite edge and sealing it thereto. Actually, the formation of the ribbon into such cylindrical, or rod-like, form will desirably be carried out in a continuous manner, and simultaneously the cylinder or rod will be transversely severed at equi-distant points $c$ spaced to lie mid-way between each paired filter element s' in such cylinder or rod as it passes beyond the forming stage just described.

Figure 18:
Fig. 18 is a sectional view similar to that of Fig. 17 showing a pair of filter elements as made from the initial cylindrical form thereof illustrated in Fig. 17 preparatory to being incorporated in a finished cigarette.

The result will be a double filter element $c'$ as shown in longitudinal section in Fig. 18. This will be seen to comprise two connected elements 2 of the form illustrated in Fig. 2, each consisting of one-half of the original paired element, and having their compacted or sealed ends directed toward each other, but spaced by a distance equal to the width of the compressed or sealed area $s$ formed in the original sheet of wadding (Figs. 14 and 15). Such double filter element $c'$ is then ready for inclusion, along with the tobacco filler, in a wrapper to produce a pair of cigarettes of the general form illustrated in Figs. 10, 12 and 13.

The particular manner in which such double filter element is thus assembled into the finished cigarette is a matter of indifference so far as the present invention is concerned. One suitable method and mechanism for so doing will be found described in my patents Re. 20,991 dated January 31, 1939 and Re. 21,007 dated February 21, 1939. Alternatively, the method and mechanism disclosed in my Patent No. 2,423,554, dated July 8, 1947, may be employed. Whatever the particular machine or method employed, where such assembly is accomplished in a continuous manner, the immediately resulting product will be a cylinder or rod C', as shown in axial section in Fig. 19, made up of alternate sections of tobacco filler and such double filter elements inserted therebetween and in close fitting contact to the ends of such sections, all enclosed within the cigarette wrapper.

Figure 19:
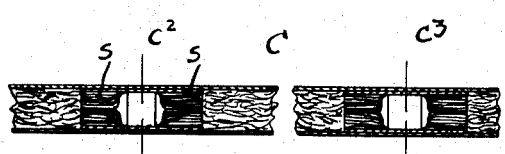
Fig. 19 is a central longitudinal section showing several such pairs of filter elements as assembled with the cigarette wrapper and tobacco filler in the course of making cigarettes by one well known type of machine.

Finally, in order then to produce the finished cigarette, such cylinder or rod C' is transversely severed, at successive points $c^2$ and $c^3$, Fig. 19, respectively located midway between the double filter elements $c'$ and the intervening section of tobacco filler. The individual cigarette thus produced will be that illustrated in previously described Fig. 10.

In the same way as has been described above for the production in a continuous manner of filter tip cigarettes of the general form illustrated in Figs. 10, 12 and 13, I may make cigarettes incorporating filter elements of each of the several forms illustrated in Figs. 2 to 9 inclusive.

Figure 20:
Figs. 20 is a central sectional view similar to that of Fig. 18, but utilizing a filter element of the form illustrated in Fig. 6.
Figure 22:
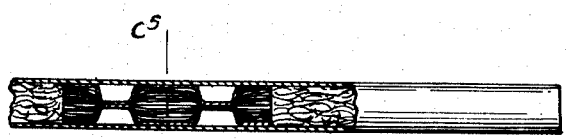
Figs. 21 and 22 are views similar to those of Figs. 18 and 19, respectively, but showing the manner in which a filter element of the form illustrated in Fig. 4 or Fig. 9 may be utilized.
Figure 21:

Thus, as illustrated in Fig. 20, a double filter element may be made by rolling up two successive elements of the form illustrated in Fig. 6, incorporated along with sections of tobacco filler in the wrapper and severed at proper intervals, indicated by line $c^4$ in Fig. 20, to produce a filter tip cigarette of the form illustrated in longitudinal cross-section in Fig. 11. Similarly, the form of filter element illustrated in Fig. 4 may be made into double units, as illustrated in Fig. 21, thus incorporated with sections of tobacco filler in the wrapper, and upon severing the latter at properly spaced intervals, indicated by line $c^5$ on said figure, a cigarette of the form illustrated in central longitudinal section in Fig. 22 is obtained.

As hereinbefore explained, instead of the sheet S being made of wadding of the particular type described in connection with Figs. 14 and 15, any other suitable filter material having the required degree of porosity and absorptive qualities may be utilized in the manufacture of my improved filter element. For example, a sheet of so-called cotton batting and having suitable thickness may be employed. In such case, since the component fibers may not be as readily compressed or compacted to give the desired sealing effect, a minimum amount of adhesive may be utilized when compressing the material on a line transverse to the axis of the cylinder into which the element is rolled prior to incorporation in the cigarette. Batting or wadding having the required characteristics may also be made of other fibrous materials and utilized in the fabrication of such element.

Particularly where the element, as first described, is made up of a plurality of layers or plies of cellulose, it serves admirably for the incorporation in the filter tip of additives or so-called filter aids, such, for example, as activated carbon. Other examples of such "aids" are silica gel, alumina, diatomaceous earth and bentonite.

These additives are for the most part solid, non-fibrous in character and are generally utilized in finely ground or powdered condition, and a serious objection to their use is that the particles tend to detach themselves from filters of the kind at present in use and come in contact with the lips and tongue of the smoker. However, by sealing off, in the manner hereinbefore described, either the outer end of my filter element, or an intermediate portion thereof, as it is finally assembled in the cigarette, any such additive material will be securely retained within the element. At the same time such material may be uniformly distributed throughout the element so as to secure maximum effect with the use of a minimum amount thereof. Thus where the element is made of filter material such as previously described, it will suffice to sprinkle the additive material lightly onto one or more of the component plies or layers of the sheet of wadding, where of the character illustrated in Fig. 1; or, in the case of cotton batting, to introduce such material at any stage in the making of such sheet, or of the filter element therefrom.

Figure 23:
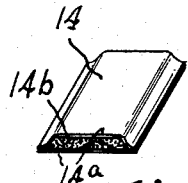
Fig. 23 is a view similar to that of Fig. 2 but illustrating the inclusion in my improved filter element of a granular component.
Figure 24:
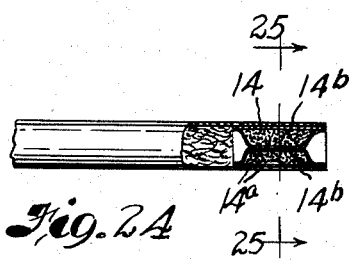
Figs. 24 and 25 are respectively a longitudinal section and a transverse section of a cigarette wherein such modified filter element has been incorporated.
Figure 25:

A filter element having the general construction hereinbefore described, and particularly the form thereof illustrated in Fig. 6, is also admirably adapted for use where the bulk of the filter material is of more or less finely dispersed or granular material. In such case, as illustrated in Fig. 23, the element 14 may consist of two spaced-apart layers 14a, each made up of one or preferably several layers of air-permeable paper such as used in making crepe or cellulose wadding, and the space between such layers is filled with a layer 14b of such disparate or granular material. Upon then sealing off the ends of the element in the manner hereinbefore described and rolling it up into cylindrical form, as shown in central longitudinal section in Fig. 24 and in cross-section in Fig. 25, the granular filler layer is not only held in place, but is prevented from sifting into the smoker's mouth. If desired, the "capsule" of granular material which is thus provided as a filter element, may also be sealed along each or both sides in the same manner as it is thus sealed at the respective ends thereof. In this way the granular material is preserved against scattering during the operations involved in forming the element into cylindrical form and incorporating it in the cigarette.

In the case of any of the several forms of filter element that are provided with an extension or lip, such as for example the lip 5a of the element illustrated in Fig. 5, or the lip 7a of the element illustrated in Fig. 7, melted paraffin wax, polyvinyl alcohol, rosin size, or any other nontoxic water-proofing material may be applied thereto to prevent it from swelling and softening when brought into contact with the mouth of the smoker. By thus reducing the water absorptive character of the resulting tip, the body of the filter element will remain dry and its efficiency or filter coefficient maintained.

It will be understood that instead of initially forming spaced series of paired filter elements in the manner illustrated in Figs. 14, 15 and 16 and the corresponding description, the sheet or blanket of padding S may be adhered to a backing or supporting sheet S³ of paper or other more pervious material of the same width, and the two then be cut longitudinally to form the so-called "ribbons" illustrated in Fig. 16. In other words, the backing sheet is attached to the sheet of wadding before instead of after the latter is compressed along lines s, and before instead of after said sheet is longitudinally slit.

Figure 26:
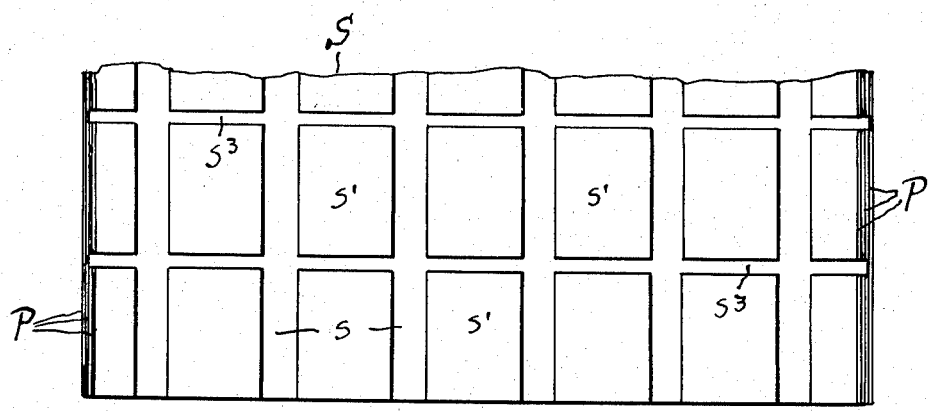
Fig. 26 is a view similar to Fig. 14 showing a modification in the formation of the sheet filter material from which the several forms of my improved filter elements may be made.

This modification in assembling the components of the filter element is illustrated in Fig. 26 in which it will be noted that such backing sheet S³ is a trifle wider than the sheet or blanket S of wadding so as to project beyond the edge thereof. Furthermore, in addition to the transverse lines or areas s of compression or sealing, similar lines or areas s³ are formed in the wadding at right angles to such first mentioned lines. Such lines s³ are so spaced apart that when the composite sheet is slit centrally therealong the resulting ribbons of paired filter elements will be of desired width. Such intersecting lines or areas of compression will of course seal the paired filter elements on all four sides, with the result that when they are rolled into cylindrical form, incorporated in the cigarette and transversely cut they will provide a filter mouth-piece of the form provided by previously described element 8 (see Fig. 8), but with lip 8c omitted.

It will of course be obvious that instead of forming compressed areas, either transverse, or both transverse and longitudinally of, the sheet S and then subsequently slitting the latter to form so-called "ribbons," the latter may be first severed from the sheet and then individually passed through appropriately formed rolls, particularly where only such transversely extending compressed areas are required. Furthermore, it may be found desirable in order to insure proper and uniform spacing of such transversely compressed areas, where they are impressed on a sheet S of full width, instead of on a ribbon severed therefrom, to stagger the compressed areas in the manner of the lines or areas s⁴, illustrated in Fig. 27.

A "ribbon," such as illustrated in Figs. 15 and 16, however formed, constitutes a convenient assembly of filter elements in their corresponding stage of fabrication for use in the subsequent operations whereby such elements are rolled into cylindrical form and then incorporated in the cigarette. Thus a ribbon of considerable length may be spirally wound on a reel from which it can be drawn for use in such subsequent operations and means may be provided for shifting, without interruption, from one reel to a second and so on. Also, if desired to employ a ribbon of still greater length, it may be wound on a wide reel in the same manner as thread is wound on a spool. This method of winding the ribbon is particularly adapted for use where it consists simply of the strip of filter materials as cut from the original sheet S before it is adhered to the cover or backing strip, and in such case, if found desirable to prevent longitudinal stretching of the ribbon, one or more threads of non-stretchable material may be incorporated in the sheet S so as to extend lengthwise of the several ribbons to be made therefrom.

Figure 27:
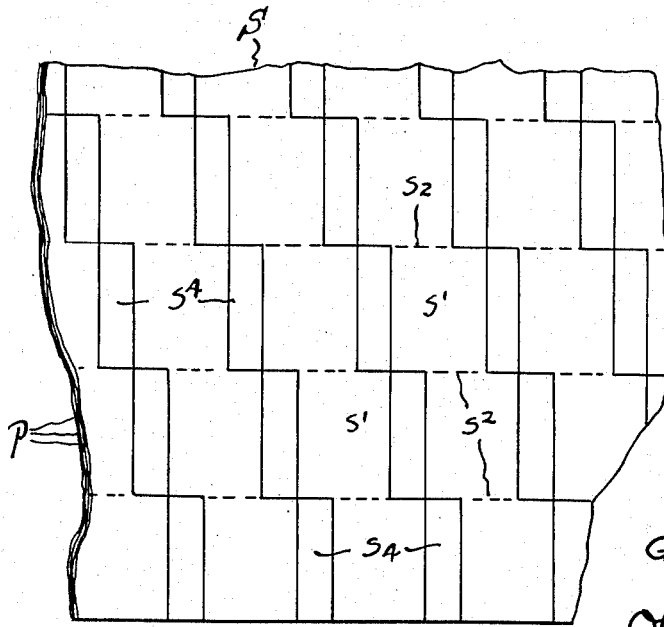
Fig. 27 shows another modification in such formation of the sheet filter material.

In each of Figs. 14, 26 and 27, wherein there is illustrated a sheet of wadding from which my improved filter elements may be made, it is to be observed that the lines or areas s in which the sheet is compacted extend transversely of the direction in which the sheet travels during formation. This is of course equally true of the "ribbon" illustrated in Fig. 16. Accordingly, the axis of the filter element, ultimately formed from the pads s', will lie parallel to such machine direction. Inasmuch as the fibers in the sheet, or component layers thereof, will tend to lay parallel with such machine direction, such fibers will continue to be so disposed in the filter element and in the finished filter tip. As a result, the fibers instead of being more or less free to detach themselves from the tip, are held in place by frictional engagement with each other, even where the transverse compacted area of the element is located between the ends thereof, as in Figs. 21 and 22.

Other forms may be employed embodying the features of my invention instead of those here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:

1. A filter element for a cigarette tip or the like comprising a substantially cylindrical portion made up of multiple sheets of air-permeable cellulosic material, with the component sheets extending lengthwise of said portion, and an integral tubular extension of said portion at the mouth end having a relatively thin, compact wall of predetermined axial extent, substantially coaxial with said cylindrical portion, said multiple sheets of air-permeable cellulosic material being secured together at such mouth end to form said relatively thin, compact wall of said tubular extension.

2. A filter element as set forth in claim 1 characterized further by the provision of particulate filter aid material interspersed between said sheets.

3. A filter element for a cigarette tip or the like comprising a substantially cylindrical portion made up of multiple sheets of air-permeable cellulosic material, with the component sheets extending lengthwise of said portion, and integral tubular extensions at the ends of said portion having relatively thin, compact walls of predetermined axial extent, substantially coaxial with said cylindrical portion, said multiple sheets of air-permeable cellulosic material being secured together at such ends to form said relatively thin, compact walls of said tubular extensions.

4. A filter element as set forth in claim 3 characterized further by the provision of particulate filter aid material interspersed between said sheets.

5. A filter element for a cigarette tip or the like comprising a substantially cylindrical portion made up of multiple sheets of air-permeable cellulosic material, with the component sheets extending lengthwise of said portion, an integral tubular extension of said portion at the mouth end having a relatively thin, compact wall of predetermined axial extent, substantially coaxial with said cylindrical portion, said multiple sheets of air-permeable cellulosic material being secured together at such mouth end to form said relatively thin, compact wall of said tubular extension, and an outer tubular shell of relatively stiff material secured to and encircling said cylindrical portion and tubular extension.

6. A filter element as set forth in claim 5 wherein said shell extends longitudinally beyond said tubular extension.

7. A filter element for a cigarette tip or the like, comprising a substantially cylindrical portion of air-permeable fibrous material, with the fibers thereof extending predominantly lengthwise of said portion, and an integral tubular extension of said portion at the mouth end having a relatively thin, compact wall of predetermined axial extent, substantially coaxial with said cylindrical portion, said fibers being secured together at such mouth end to form said relatively thin, compact wall of said tubular extension.

8. A filter element as set forth in claim 7 characterized further by the incorporation of particulate filter aid material dispersed throughout said cylindrical portion.

9. A filter element for a cigarette tip or the like, comprising a substantially cylindrical portion of air-permeable fibrous material, with the fibers thereof extending predominantly lengthwise of said portion, an integral tubular extension of said portion at the mouth end having a relatively thin, compact wall of predetermined axial extent, substantially coaxial with said cylindrical portion, said fibers being secured together at such mouth end to form said relatively thin, compact wall of said tubular extension, and an outer shell of relatively stiff material secured to and encircling said cylindrical portion and tubular extension.

10. A filter element as set forth in claim 9 wherein said shell extends longitudinally beyond said tubular extension.

References Cited in the file of this patent

UNITED STATES PATENTS

| | | |
|---|---|---|
| 1,585,919 | Irving | May 25, 1926 |
| 1,950,542 | Copell | Mar. 13, 1934 |
| 1,988,805 | Molins | Jan. 22, 1935 |
| 2,159,121 | Alley | May 23, 1939 |
| 2,164,702 | Davidson | July 4, 1939 |
| 2,178,820 | Todoroff | Nov. 7, 1939 |
| 2,181,614 | Streifling | Nov. 28, 1939 |
| 2,202,839 | Davidson | June 4, 1940 |
| 2,221,443 | Davidson | Nov. 12, 1940 |
| 2,521,985 | Lang | Sept. 12, 1950 |
| 2,668,544 | Davidson | Feb. 9, 1954 |
| 2,695,617 | Warnberg | Nov. 30, 1954 |
| 2,808,057 | Yaksch | Oct. 1, 1957 |

FOREIGN PATENTS

| | | |
|---|---|---|
| 425,869 | Great Britain | Mar. 22, 1935 |
| 523,861 | France | Aug. 26, 1921 |